Nov. 8, 1932.                S. POLAND                1,886,732
                           BENDING PLIERS
                        Filed Jan. 22, 1931
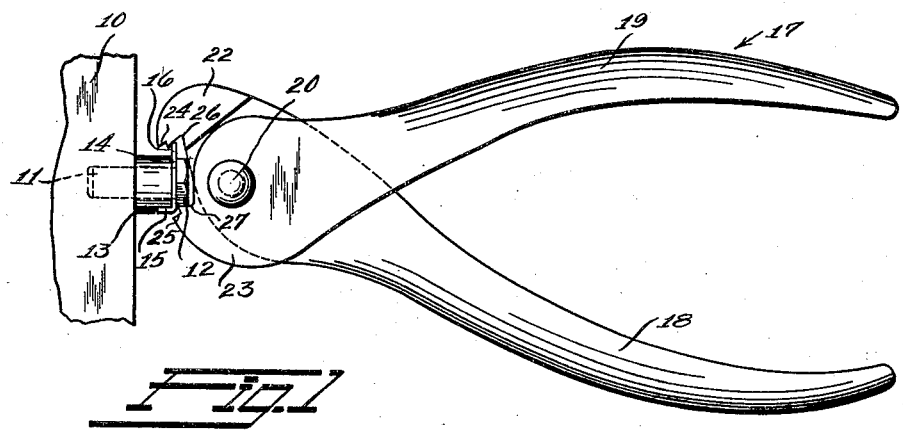
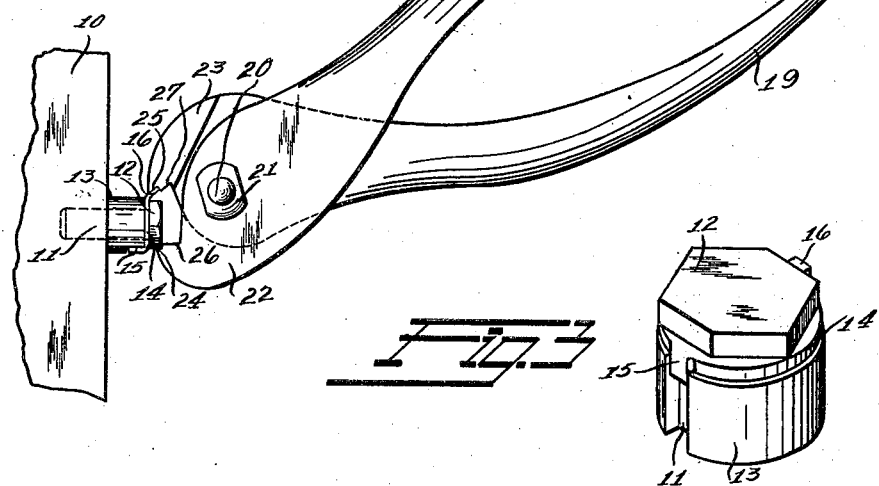
Inventor
Sprigg Poland
By Strauch & Hoffman
Attorneys Patented Nov. 8, 1932

1,886,732

UNITED STATES PATENT OFFICE

SPRIGG POLAND, OF WINTER PARK, FLORIDA

BENDING PLIERS

Application filed January 22, 1931. Serial No. 510,543.

This invention relates to pliers, particularly pliers of the type that are used for bending purposes. More specifically, my invention comprises an improved construction for a pair of pliers especially adapted for bending over the lips of a lock washer, which is formed with tongue-like extensions or lips, adapted to be bent down parallel to the axis of the bolt for locking purposes. The head of the bolt is held by the bent down lips to prevent the head from turning and the bolt from inadvertently working loose due to vibration or other causes.

More particularly my improved bending pliers are specifically designed and adapted to bend over and upward against the head of the bolt, one lip of a lock washer as used on the attachment bolt on an automobile starter, though it is in no sense limited to this single use.

Frequently in devices in which lock washers are placed on bolts and the lock washer lips bent over to securely retain the bolts in position, the working space is very limited and the mechanic or workman must operate in very cramped quarters and on elements which are not easy to get at with ordinary tools. This is especially true in repairing the starting coupling between the electric starting motor and the flywheel of an automobile, more particularly known as the starter, and when, as is usual, this is of the Bendix type, it is commonly known as the Bendix drive or bendix.

In this driving coupling a bolt is used to hold the spring which forms a resilient driving member, to the driven member which is a worm or screw. A collar is formed on the spring and a bolt extends through this collar into the worm shaft. This bolt is commonly retained in place by means of a lock washer formed with two extending lips, one of which is adapted to extend into a recess formed in the spring collar and the other of which must be bent up against the head of the bolt to "lock" the bolt in position. As used on the Bendix drive the lip that is positioned in the collar recess is already bent over but the other lip must be bent over against the head of the bolt after the bolt is secured in position. This bending over of the lip must be done in very restricted quarters and the construction is such that the ordinary and usual repair shop tools are not easily adapted to perform this operation. In the present usual practice the mechanic takes a screw driver and attempts to force this lip up against the head by hammering on the end of the screw driver. This is exceedingly difficult and laborious since it is difficult to insert such large tools in the limited space. Moreover it is fundamentally a "hit or miss" operation, as a clean bending action is not obtained, the lip being hammered or forced out of shape by the screw driver, and an accurate bending over and a definite locking action, upon which reliance can be placed is not obtained. In the present practice and with the present tools a pair of ordinary pliers cannot be used as it is impossible to grasp the small washer lip in the pliers and bend it over because the space is too limited, and the lip is too small an element to allow of it being firmly grasped and bent by known forms of pliers. The operation as performed with the screw driver is at best a crude one, and the lip is never easily bent over and almost never is a satisfactory locking job obtained. My pair of pliers is adapted to easily slip over the lock washer and bolt, in the limited space provided, and to easily and securely bend down the washer lip to locking position.

More particularly, my pliers do not grip the lip as ordinary pliers would do if they could be used on the small washer lip, but slip over the washer and bolt head. The jaws are constructed with bending die surfaces and subsequent actuation of the pliers bends the lip over into locking position. That is, where in ordinary pliers a twisting or "wrist action" would be necessary in order to bend the lip, my pliers will bend the lip down securely against the bolt head, without deformation or mutilation of any sort to the washer, by merely forcing down on the plier arms.

While I have illustrated the difficulty of bending over the lips of lock washers with particular reference to an automobile starter, it must be understood that the small size of the parts operated upon and the limited amount of available space were described in this connection as merely illustrative. My improved pliers are in no sense limited to this one particular use but they are adapted to be used in any bending operation, lock washer or otherwise in which the element to be bent is of small size and not easily grasped and bent by ordinary gripping pliers. In most installations in which a lock washer is used to hold a bolt or screw in place, the bending operation must be performed in very cramped quarters and the element to be bent is a small member made out of relatively tough metal. An ordinary pair of pliers cannot be used and other bending methods by other tools are haphazard and yield unsatisfactory results. My bending pliers by slipping over the entire assembly of bolt or screw head and washer, instead of gripping any one small element allows a pair of pliers to be used for this operation where ordinarily they could not be used; and pliers ordinarily furnish the simplest and most easily used hand tool.

I have invented a pair of pliers that can efficiently be used for the difficult job of bending small pieces of metal such as lock washer lugs or lips, in contracted or limited working spaces, and I have adapted this simple tool to this tedious operation. It will be noticed that the tool is compact, efficient, and simply constructed, and in addition to its effectiveness for this bending purpose, it is relatively inexpensive, so that it may be readily added to every mechanic's repair kit.

In the drawing which forms a part of this specification and to which reference is hereby made, the pliers are shown as used on the lock washer of an automobile starter. This is merely illustrative of one use of the tool.

Figure 1 is a plan view of the pliers showing a bolt and lock washer formed with an extended lip. The jaws of the pliers are shown performing the first operation in the step of bending the lip into abutting relationship to the head of the bolt.

Figure 2 is a plan view of the pliers operating on the same lock washer to perform the second step completing the entire bending operation.

Figure 3 is a perspective view showing the assembled bolt, lock washer and collar through which the bolt extends.

In the drawing 10 represents the collar on the starting coupling shaft or other element with which the bolt 11 is threaded. This bolt is formed with head 12 and extends through collar 13, securely holding this collar to the shaft. Between bolt head 12 and collar 13 extends the lock washer 14 formed with extending lips 15 and 16. Lip 15 is already bent at right angles to the washer surface before the washer is placed in position and the lip 15 extends downwardly into a recess adapted to receive it and formed in the collar 13. The other lip 16 is to be bent upwardly against the head 14 in order to securely hold the bolt against rotation due to vibration or any other cause.

The pliers indicated generally at 17 have the usual two arms 18 and 19 pivoted at 20 which forms the fulcrum. This pivot pin 20 is formed with a screw threaded end upon which nut 21 is screwed to prevent the two arms of the pliers from becoming disassociated. Instead of this screw-threaded bolt shown, a rivet may be used as pivot pin 20. The use if a rivet is desirable when it is not desired to disassemble the pliers, as this construction is cheap to manufacture, and it prevents the possibility of the bolt or nut becoming disassembled and lost.

The jaws of the pliers are formed as shown with one jaw 22 longer than the other jaw 23. Each jaw is formed as shown with a plurality of notches, the first notch in each jaw, indicated by numerals 24 and 25, is a relatively small notch formed by two plane surfaces making an angle of slightly over 90° with each other. The second notch formed in each jaw, indicated by numerals 26 and 27, is a larger notch and is formed by two planes which make different angles with respect to each other on each jaw. On the larger jaw, notch 26 is formed by planes at an angle of about 65° to each other, substantially less than a right angle, and the notch 27 on the shorter jaw is at slightly over a right angle. These notches 26 and 27 are somewhat larger and deeper than the first notches 24 and 25 in each jaw member. The notches 24 and 25 are substantially duplicates of each other on each jaw as respects the size, angular relationship and spacing. It will be noted that notches 24 and 25 are designed so that they will fit over the head of the screw or bolt when the tool is being used, and the angular relationship is such that they will fit over the rounded or oval screw or bolt head. Similarly notch 27 fits over the rounded head, in the operation of the tool, and the angle is such that the notch will snugly fit the head.

In use, the long jaw 22 of the pliers is placed as shown in Figure 1 over the extending lip 16 which is to be bent into abutting relation with the bolt head 12. The second notch 27 in the shorter jaw fits securely over the bolt head 12 at the side opposite from lip 16 as shown in Figure 1. In the same figure it is seen that one wall of the notch 26 located in the longer jaw is in camming engagement with the under side of the lip 16. The other wall of notch 26 constitutes a fulcrum or bearing which bears against the bolt head 12 to prevent the pliers from bodily shifting during the bending operation. Upon pressure being applied to the pliers through arms 18 and 19, notch 27 bears firmly against the bolt head and lip 16 is bent downwardly to the position shown in Figure 2, by the inclined edge of notch 26, which acts as a camming or bending die.

When the lip is bent partially to position as shown in Figure 2, the pliers are simply reversed, or turned over and notch 25 engages the bent over edge as shown. Notch 24 securely fits over the corner of the bolt head and when pressure is applied to the arms 18 and 19 lip 16 is bent over and crimped against the head 12 of the bolt. It will thus be seen that the longer jaw of the pliers is first used to bend the lip down part way and then the short jaw of the pliers is used to complete the operation and crimp the lip. During both operations one of the notches in the other jaw securely fits over the head of the bolt and forms an abutment against which the pliers bear.

While I have described my improved tool and its use with particular reference to bending the lip of a lock washer such as used on an automobile starter, it must be understood that this is used merely for purposes of illustration and is not the only use for the pliers. It is a valuable and important tool where any sheet metal has to be bent in narrow or restricted space. Thus it is entirely conceivable that by making the pliers of larger size, lips or sheet metal lugs of considerably longer length might be bent; or by making the pliers of considerably greater depth in a direction perpendicular to the plane of the paper as shown in the drawing, the pliers might be adapted to handle and bend larger pieces of sheet metal. All these changes are within the contemplation of my invention and all uses whether or not for the bending purpose they are particularly designed for, are intended to be included in its scope.

It will be appreciated that my tool is simple, inexpensive, and compact, and especially adapted for bending purposes. It will be noted that by allowing the pliers to be slipped over the entire assembly instead of attempting to grasp the small sheet metal extension, I have adapted a pair of pliers to a bending use in restricted spaces and for operation on small elements, where this efficient hand tool could not be used before.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What I claim and desire to secure by United States Letters Patent is:—

A pair of pliers having a long jaw and a short jaw, each jaw terminating in a substantially right angled notch so facing toward the other jaw that one wall of each notch is substantially parallel to the corresponding notch of the other jaw when said jaws are in work engaging position, the greater length of the longer jaw causing its notch to travel in an arc greater than but concentric with the notch of the short jaw whereby a relatively great clamping action is produced, there being a reentrant recess formed in each jaw between its notch and its pivot, the recess in the long jaw forming a shoulder thereon which constitutes a fulcrum point against which the work may bear, said recesses affording a space for work between said jaws.

In testimony whereof I affix my signature.

SPRIGG POLAND.